United States Patent [19]
Younes

[11] Patent Number: 5,118,217
[45] Date of Patent: Jun. 2, 1992

[54] MOVEABLE FLOOD BARRIER

[76] Inventor: Joseph F. Younes, 16 Spring St., Augusta, Me. 04330

[21] Appl. No.: 677,253

[22] Filed: Mar. 28, 1991

[51] Int. Cl.⁵ ............. E02B 7/02; E02D 31/00
[52] U.S. Cl. ............. 405/114; 52/169.14; 405/91; 405/107
[58] Field of Search ............. 405/114, 115, 91, 87, 405/100, 107; 52/169.14; 137/363

[56] References Cited

U.S. PATENT DOCUMENTS

| | | | |
|---|---|---|---|
| 4,252,461 | 2/1981 | Colamussi et al. | 405/91 X |
| 4,375,929 | 3/1983 | Clark | 405/114 |
| 4,377,352 | 3/1983 | Goodstein | 405/92 X |
| 4,505,612 | 3/1985 | Shelley | 405/100 X |
| 4,881,854 | 11/1989 | Bowe | 405/115 X |

FOREIGN PATENT DOCUMENTS

| | | | |
|---|---|---|---|
| 1217143 | 12/1959 | France | 137/363 |
| 2570728 | 3/1986 | France | 405/100 |

*Primary Examiner*—Dennis L. Taylor

[57] ABSTRACT

A moveable flood barrier requires a permanent channel in the path of expected flood waters and is normally closed by a removeable cover. The barrier consists of a series of units dimensioned to be removeably seated in the channel and detachably interconnected. Each unit includes at least one panel disposed to face flood waters and a reenforcement to which the panel or panels are attached. The junctions between panels are sealed and seals extend lengthwise of the barrier and are secured to the panels thereto and detachably secured to the channel wall first in the path of the flood waters. Where required, a brace for each unit is detachably secured thereto and to a permanent normally covered socket on the leeward side of the channel.

7 Claims, 11 Drawing Sheets

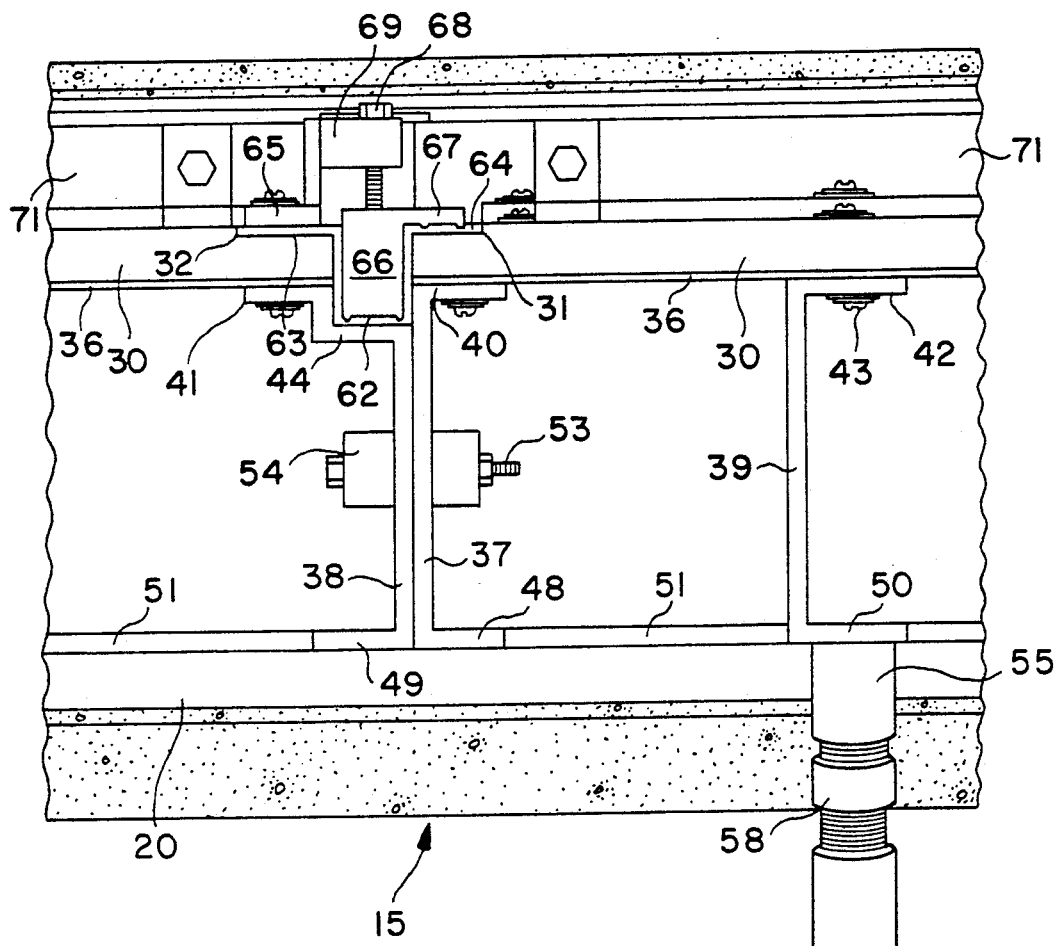
FIG. 7
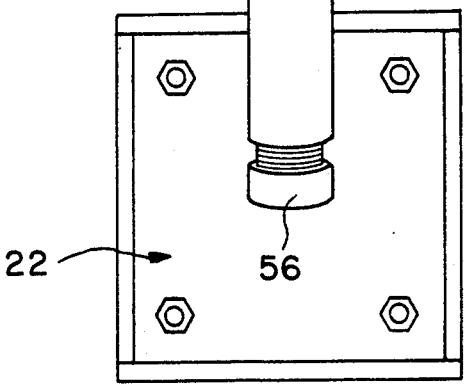

MOVEABLE FLOOD BARRIER

BACKGROUND OF THE INVENTION

Flood waters annually cause substantial damage and, as far as I am aware, attempts to prevent such damages are principally the temporary employment of sandbags or the use of permanent levees to form barriers against flood waters.

THE PRESENT INVENTION

The general objective of the present invention is to provide a barrier against flood waters which can be erected when needed and removed and stored for reuse when flood waters have subsided.

That objective is attained by providing a permanent channel in the path of expected flood waters and a plurality of units temporarily seated in the channel with each unit provided with at least one panel disposed to front flood waters and having a reenforcement including end walls, an intermediate wall and a base. The units are positioned in the channel in an abutting relationship and detachably held in mutual contact. Releasable seals protect the vertical junctions between panels and releasable seals extend lengthwise of the barrier and are held in sealing contact with the panels and the outer channel wall. In practise, the vertical and lengthwise seals overlap.

A particular objective of the invention is to enable units of substantial height to be used. To that end, each unit is provided with a detachable brace and permanent sets are provided rearwardly of the channel to receive and hold the braces while the barrier is in use.

Another important objective of the invention is to enable the units to be installed in and moved lengthwise of the channel into a position of use, an objective attained by providing the base of each unit with rotatable supporting members for engagement with the bottom of the channel and establishing the bottom of the channel as a level runway.

Yet another objective of the invention is to enable an installed barrier to have angular sections as well as straight sections. In accordance with this aspect of the invention, corner establishing units are provided with each also having a panel secured to an end wall and with that end wall having a side flange disposed to abut against and be connected to an end wall of a unit disposed at an angle thereto.

In preferred embodiments, there are different types of units all of the same length, width and height. A first type has a vertical seal at one end having flanges of which one is to be brought into and held in sealing contact with the adjacent side margin of the panel of that unit and with the other flange brought or to be brought and sealed against the adjacent side margin of the panel of the abutting unit.

A second and third types of units are corner establishing units with the side margins at opposite ends of the panels of each engageable by vertical seals of abutting units and with the junction of the two panels of each unit sealed. The difference between the second and third units is that in the second type it is one end wall which has the additional panel while in the case of the third type of unit, it is the other end wall which has the additional panel. Both the second and third types of units have their lengthwise seals in use extending along both panels. The fourth type of unit is similar to the first type except that it is provided in use with like sealing means at each end.

Other objectives of the invention and the manner by which they are attained will be apparent from the following description of preferred embodiments of the invention and the appended claims.

BRIEF DESCRIPTION OF THE DRAWINGS

The accompanying drawings illustrate preferred embodiments of a moveable flood barrier in accordance with the invention with FIG. 1 a somewhat schematic plan view of the covered channel for the barrier and seats for the braces;

FIG. 7 is a plan view illustrating the junction o two such units;

THE PREFERRED EMBODIMENT

Figure 1:
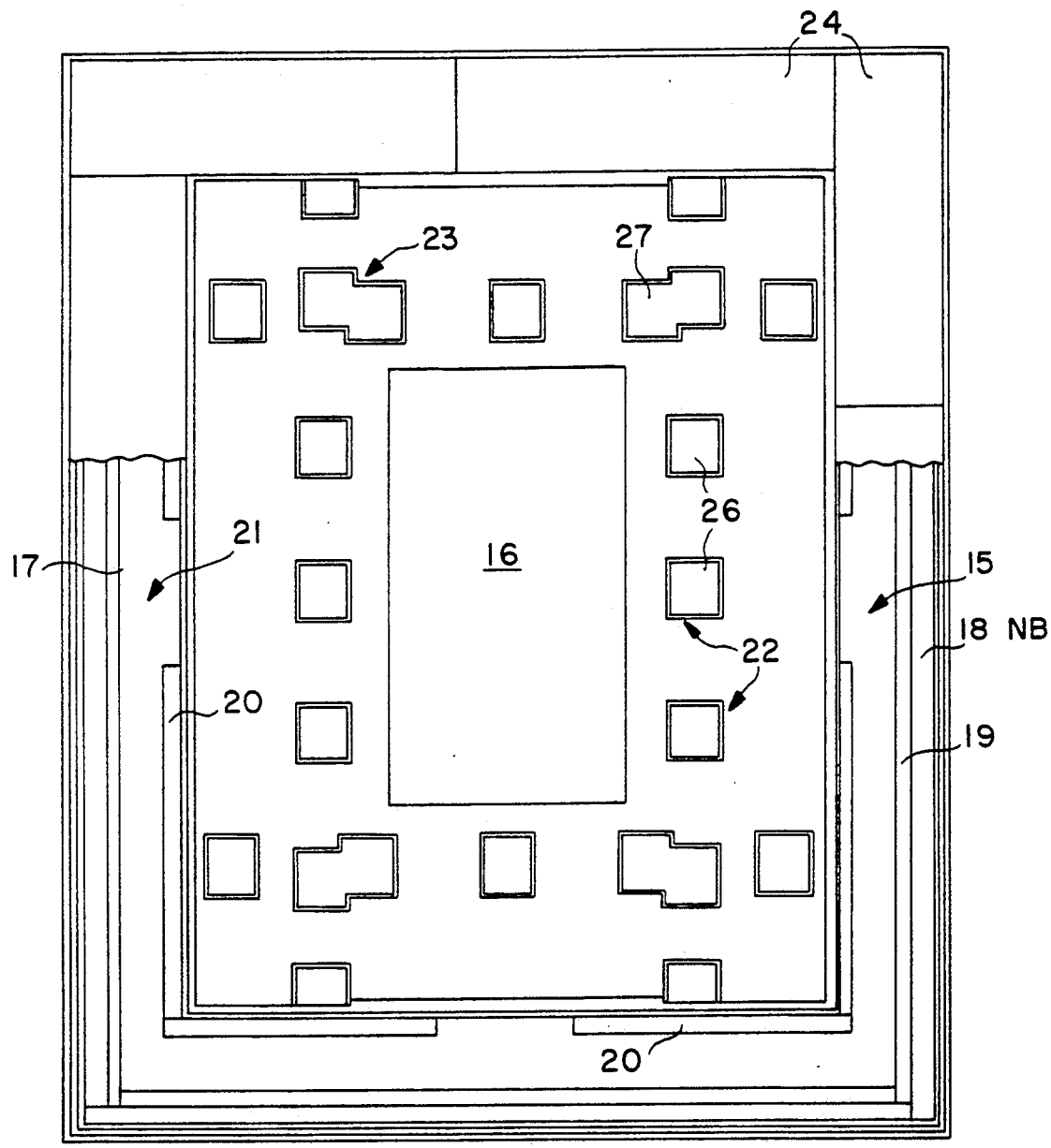

Reference is first made to FIG. 1 wherein a concrete channel, generally indicated at 15, is shown as surrounding an area in which there is a building, generally indicated at 16, to be protected whenever flood waters threaten. The channel 15 is shown as rectangular and, see FIG. 3, as provided with a metal bottom or runway 17, a metal L-shaped seat 18 extending along the outer wall of he channel and above a metal retainer 19, extending along its outer wall and a similar retainer 20 extending along its inner wall with each straight section having a gap 21 for use in the assembly and removal of the barrier.

Located inwardly of the channel 15 are seats embedded in concrete, a series of seats, generally indicated at 22 for each straight section of the channel 15 and a generally indicated seat 23 associated with each corner thereof. Under normal conditions, the channel 15 and the seats 22 and 23 are covered by removable covers, the covers 24 for the channel 15 resting on the channel shoulders 25 and the covers 26 and 27 resting on the walls of he seats 22 and 23 respectively.

Figure 2:
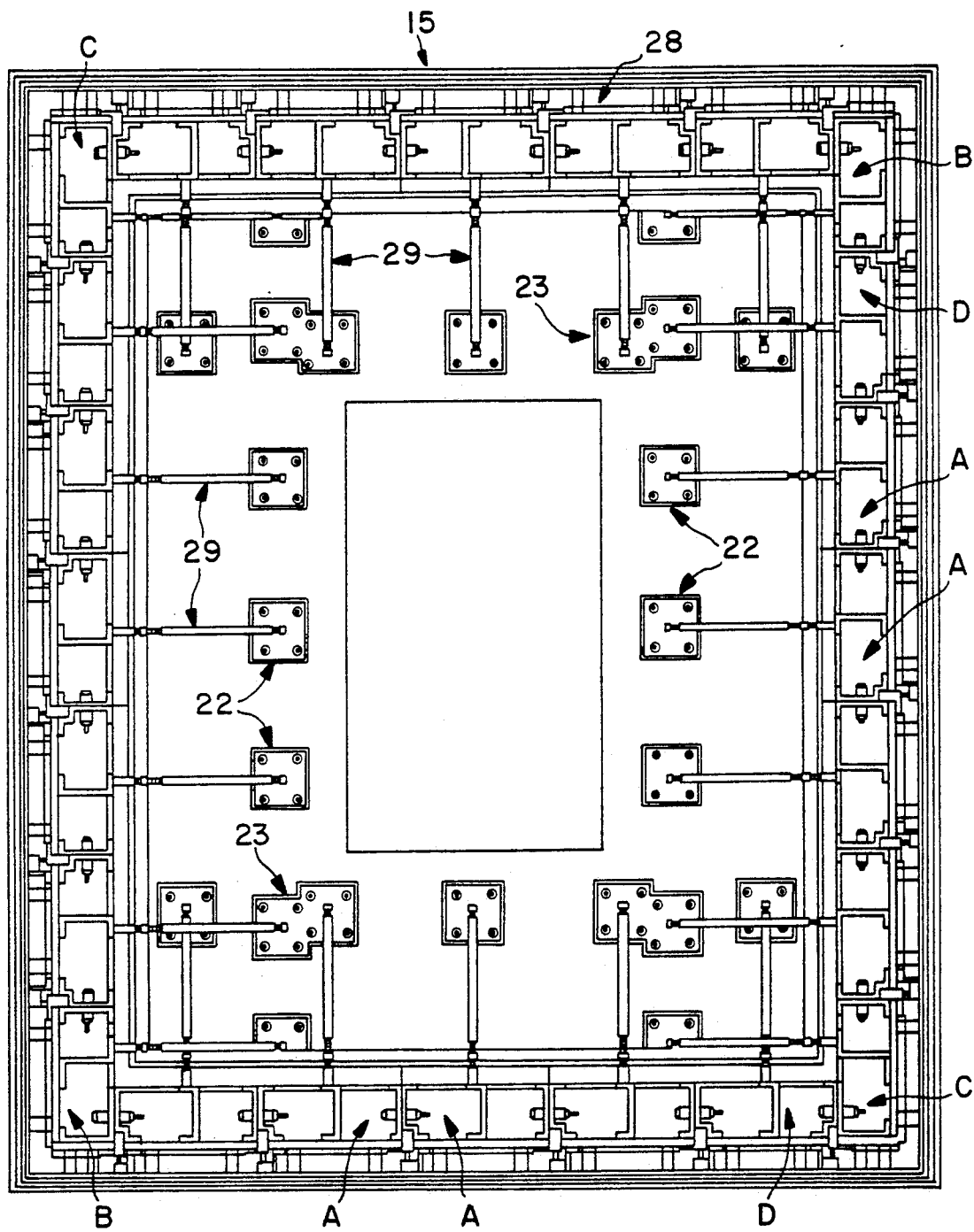
FIG. 2 is a like view with the channels and seats uncovered and the barrier installed.

In FIG. 2, the covers 24, 26 and 27 have been removed and placed in storage and a flood barrier, generally indicated at 28 has been installed in anticipation of flooding. The barrier 28 consists of abutting units so dimensioned that they may be seated in the channel 15 and are shown as all of he same length, width and height. Of these, the generally indicated units A extend along each straight section of the barrier and are connected to a side generally indicated corner establishing units B or C by units, generally indicated at D. The units are shown as being backed by braces, generally indicated at 29 with each brace 29 anchored in a seat 22, 23. Of the units A, B, C and D, the units A are first detailed as a straight barrier may consist of such units only and in a barrier of any other configuration, the units A are the far more numerous.

Figure 8:
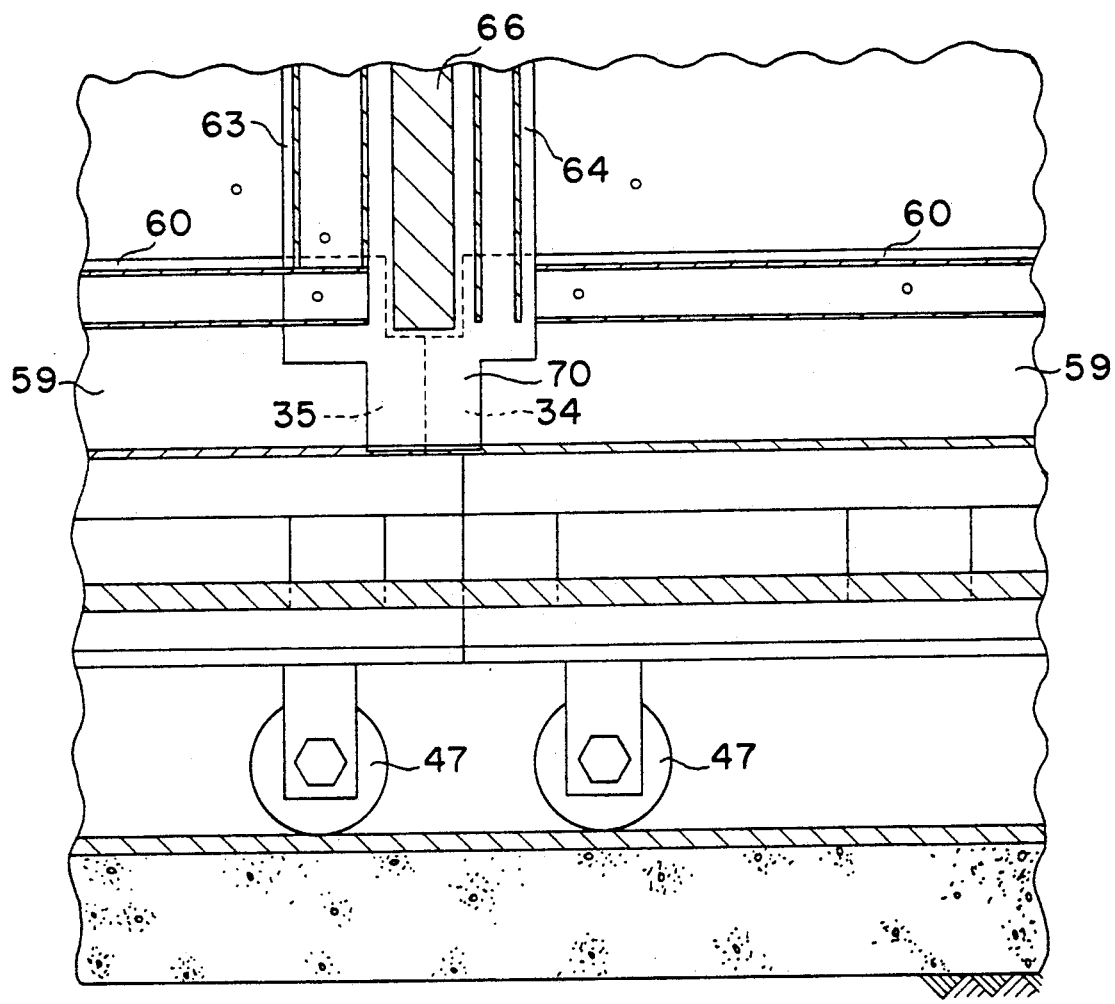
FIG. 8 is a section taken approximately along the indicated line 8—8 of FIG. 7.
Figure 9:
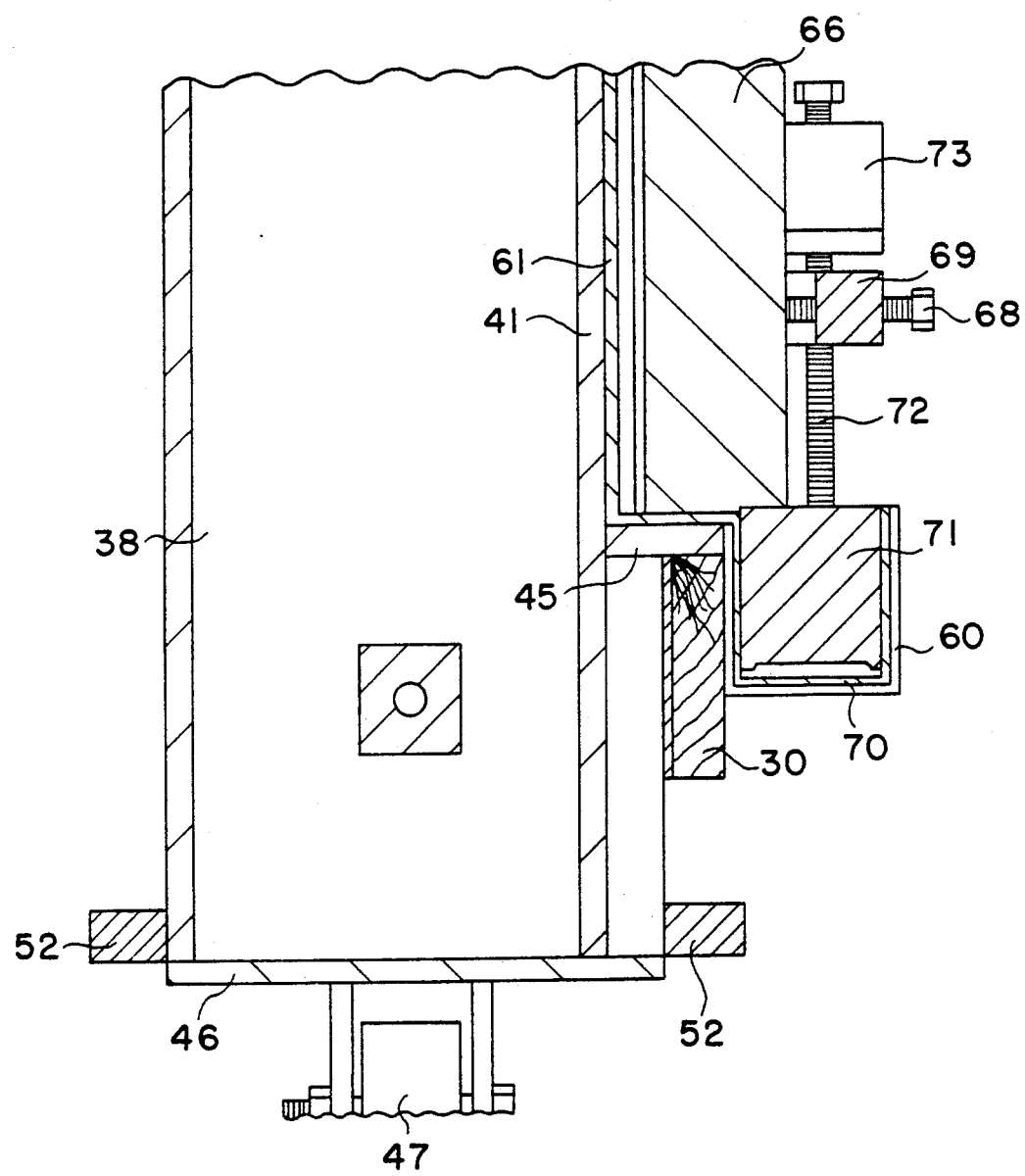
FIG. 9 is a fragmentary section taken approximately along the indicated line 9—9 of FIG. 8.

Each unit A, see FIGS. 3-9, consists of a flat front panel 30, shown as wooden, facing the expected flood waters and the front or outer face of the panel 30 is marginally recessed to establish shallow seats 31 and 32 at each end and a like seat 33 extending along its bottom. As shown in FIG. 8, the lower ends 34, and 35 of the seats 31 and 32 are narrowed. The inner or rear surface is shown as protected by a water proofing layer 36. Panel reenforcing framework consists of and walls 37 and 38 and an intermediate wall 39 with the walls having outer end flanges 40, 41 and 42, respectively, to which the panel 30 is secured by screws 43 provided with metal and compressible washers and extending through the outer end flanges and into the panel 30. The end wall 37 and the intermediate wall 39 are shown as identical but the end wall 38 has its outer end flange 41 offset by a vertical seat 44 the bottom 45 of which is above the bottom edge of the panel 30 (see FIG. 9) so that the seat 44 and end wall 38 protrude beyond the adjacent end of the panel 30 by width of the seat 44. A base 46 is welded to the bottom ends of the walls 37, 38 and 39 and is provided with supporting wheels 47. The walls 37, 38 and 39 have inner end flanges 48, 49, 50 respectively int he same vertical plane and are interconnected by vertically spaced reenforcements 51.

Figure 3:
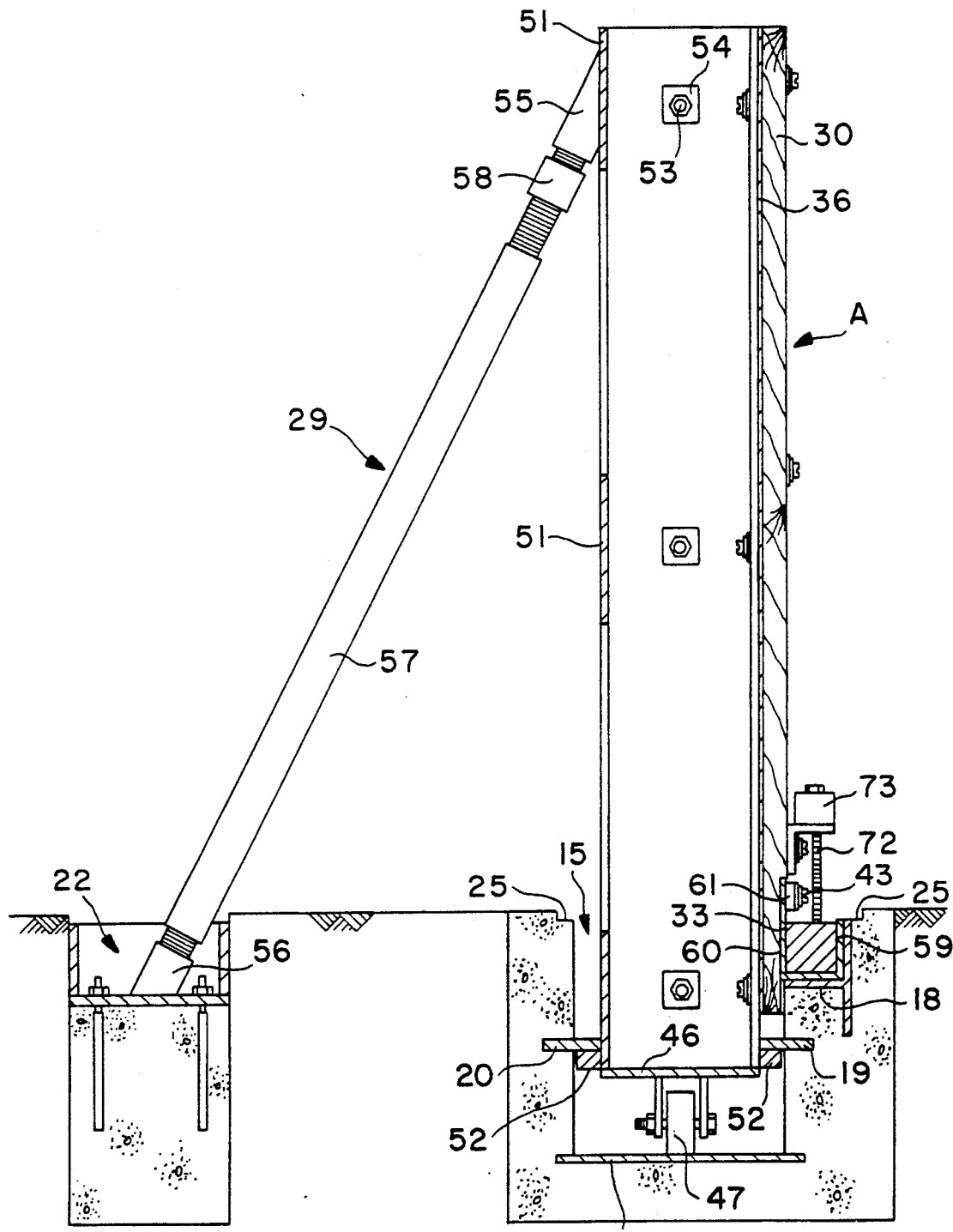
FIG. 3 is a section, on an increase in scale, taken approximately along the indicated line 3—3 of FIG. 2.
Figure 4:
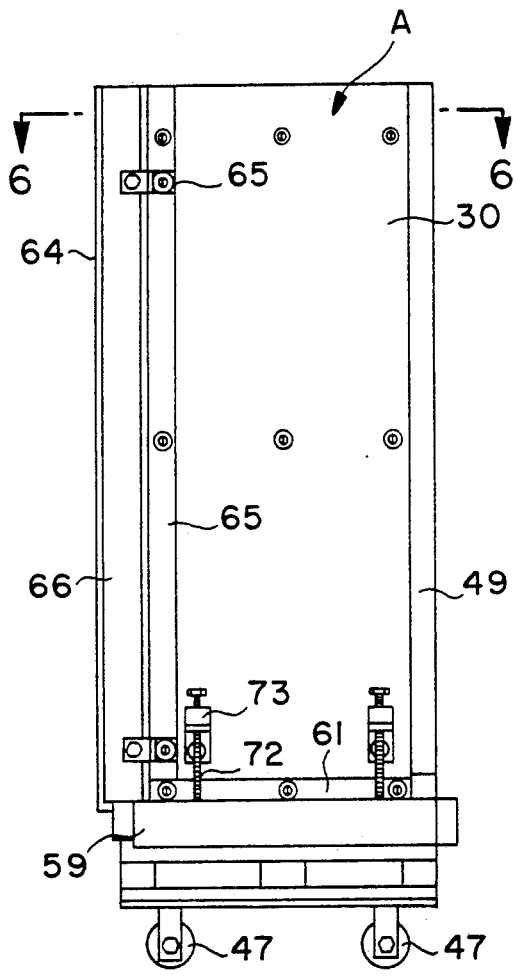
FIG. 4 is a front view of the type of unit of which a barrier is principally composed.
Figure 5:
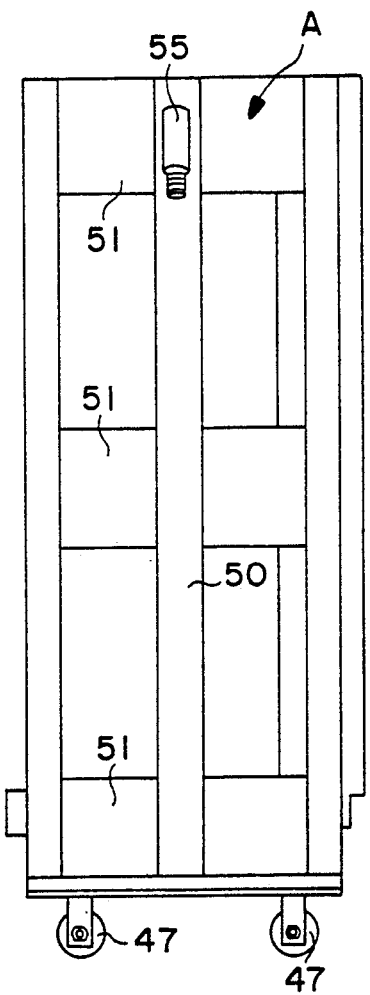
FIG. 5 is a rear view of the unit shown in FIG. 4.
Figure 6:
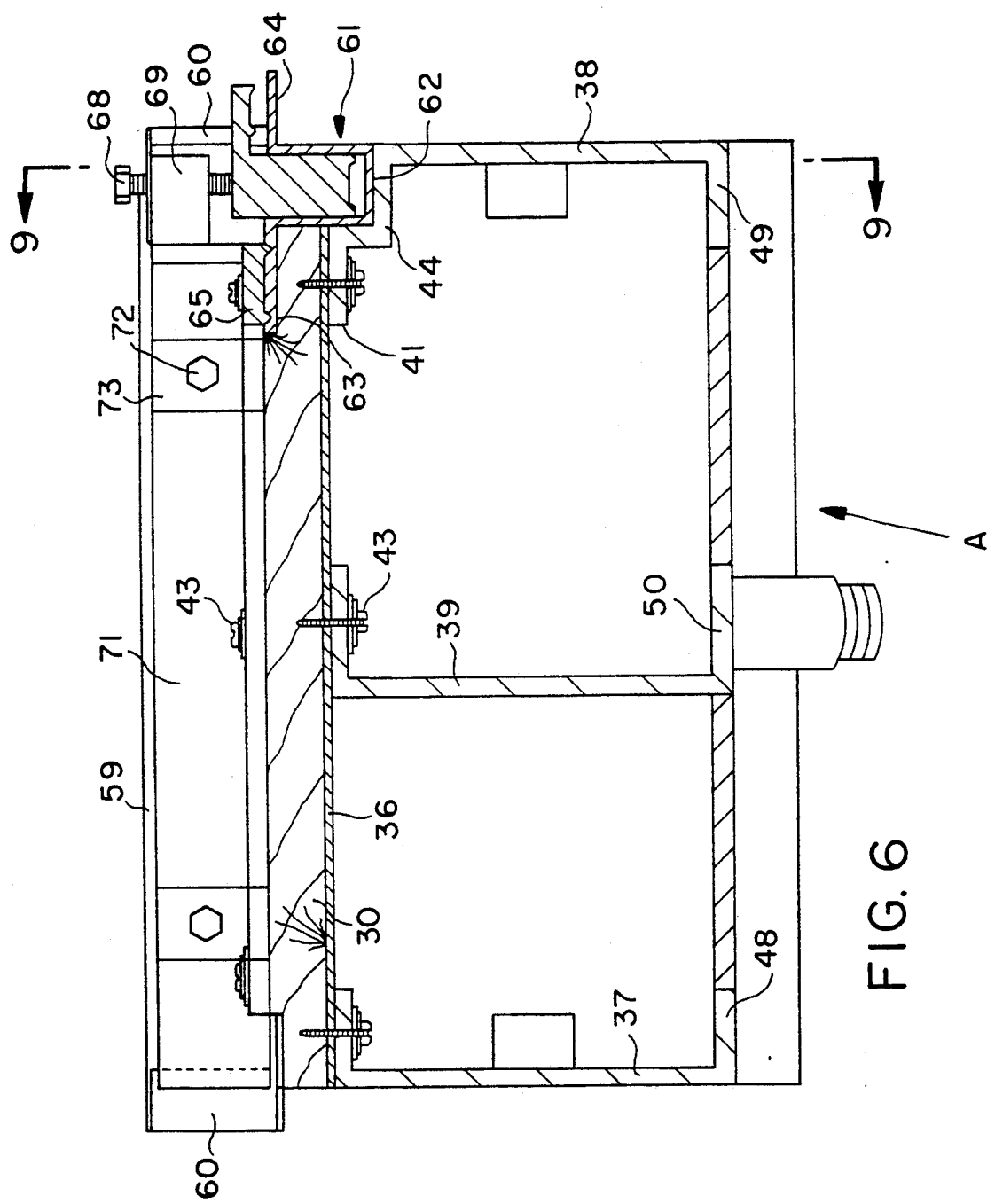
FIG. 6 is a section on an increase in scale, taken approximately along the indicated line 6—6 of FIG. 4.

As shown in FIG. 3, the unit A, when seated in the channel 15 fits freely between its retainers 19 and 20 and shoulders 52 are welded to the side margins of the walls 37, 38 and 39 in positions to closely underlie the retainers 19 and 20, respectively, in order that tilting of a unit will be opposed. In practise and except where the ends of a straight channel are not obstructed, a gap 21 serves to enable a unit to be placed in the channel 15 and then rolled into a wanted position or butted against an already positioned unit in which case the end wall 37 of one unit is secured against the abutting end wall 38 of another unit by vertically spaced bolts 53 extending through bosses 54 secured to the inner sides of the walls 37 and 38.

In order to ensure that the force exerted by flood waters will not disturb the units of a barrier 28, braces 29 are employed and one such may be best seen in FIGS. 3 and 7. The upper end of the intermediate wall 39 has a downwardly inclined threaded fitting 55 and in each seat 22, there is a threaded socket 56 while in the seats 23 there are two sockets 56. Each brace 29 has a bracing rod 57 having threaded ends, one of which is threaded into a socket 56 while the other threaded end and the fitting 55 are connected by an adjustable coupling 58.

The means by which flood water is prevented from leaking through or under the units of a barrier include separate seals for the potential leakage paths.

In order to effect the lengthwise sealing of the barrier 28, a length of a preformed, compressible, U-shaped seal 59 is provided for each unit A and a margin 60 thereof is held in the seat 35 by means of a metalic strip 61 anchored to the panel 30 by a series of screws 43. The seal 59 is dimensioned to fit the seat 18 and it will be noted, see FIGS. 4 and 5, that it protrudes a short distance beyond one end of the unit A and terminates an equal distance short of the other end thereof. At each end of the seal 59 there is an internal seat 60 and its wall thickness is reduced. The inner wall of each seat is shown as longer than the bottom and opposite side thereof.

The sealing of the junctions of adjacent units is effected with a preformed vertical seal, generally indicated at 61 of resiliently compressible stock. The seal 61 has a central U-shaped portion 62 shaped and dimensioned to fit the walls of the seat 44 and against its bottom 45 and side flanges or wings 63 and 64. The wing 63 is dimensioned to fit the shallow seat 32 of the panel 30 against which it is held by a retainer 65 secured by vertically spaced screws 43 while the wing 64 is disposed, see FIG. 7, to overlie the shallow seat 31 of the panel 30 of the next installed unit A.

A pressure bar 66 in the seal portion 62 has a wing 67 which overlies the seal wing 64 and the entire seal 61 is subjected to sealing pressure effected by screws 68 threaded through brackets 69 held in place by the screws 43 anchoring the wing 64 of the seal 61.

Below the U-shaped portion 62 of the vertical seal 61, see FIG. 8, the wings 63 and 64 are continued to form a narrowed end section 70 of a width such that one half thereof fits the lower end 35 of the shallow seat 32 with the other half available to fit the lower end 34 of the shallow seat 31 of an abutting unit. The end of the lengthwise seal 59 is reduced in thickness by one half so that when fitted in the seats 60 of abutting seals 59 to overlie their junction, the thickness of the seal is constant. A bar 71 within the seal 59 is subjected to pressure by screws 72 threaded through brackets 73 mounted on the front of the panel 30 thus to ensure effective sealing.

From the foregoing, it will be apparent that identical units A can be readily employed with an existing channel to form a barrier with potential leakage paths effectively sealed.

It will be noted from FIG. 2 hat one pair of the diagonally opposite corners of the barrier 28 consists of units B and D with the other pair of diagonally opposite corners consisting of units C and D. As the units B, C and D are generally similar to the units A, each will be detailed only as to added or different features. Corresponding parts are designated by the reference numerals employed in the description of the units A but are distinguished by the appropriate alphabetical suffix addition B, C or D.

Figure 10:
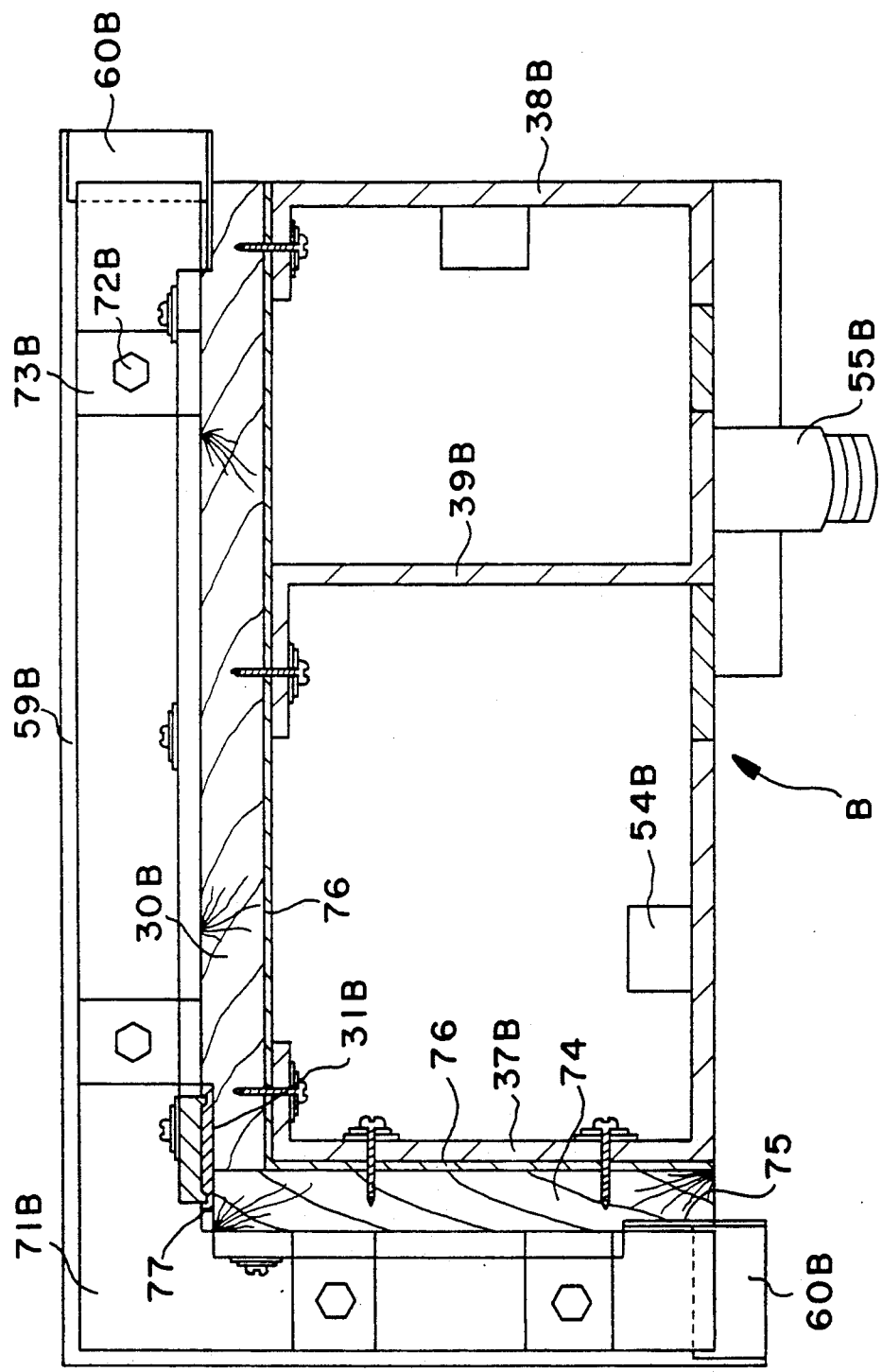
FIG. 10 is a lengthwise, horizontal section of one type of unit employed in forming a corner in a barrier.
Figure 11:
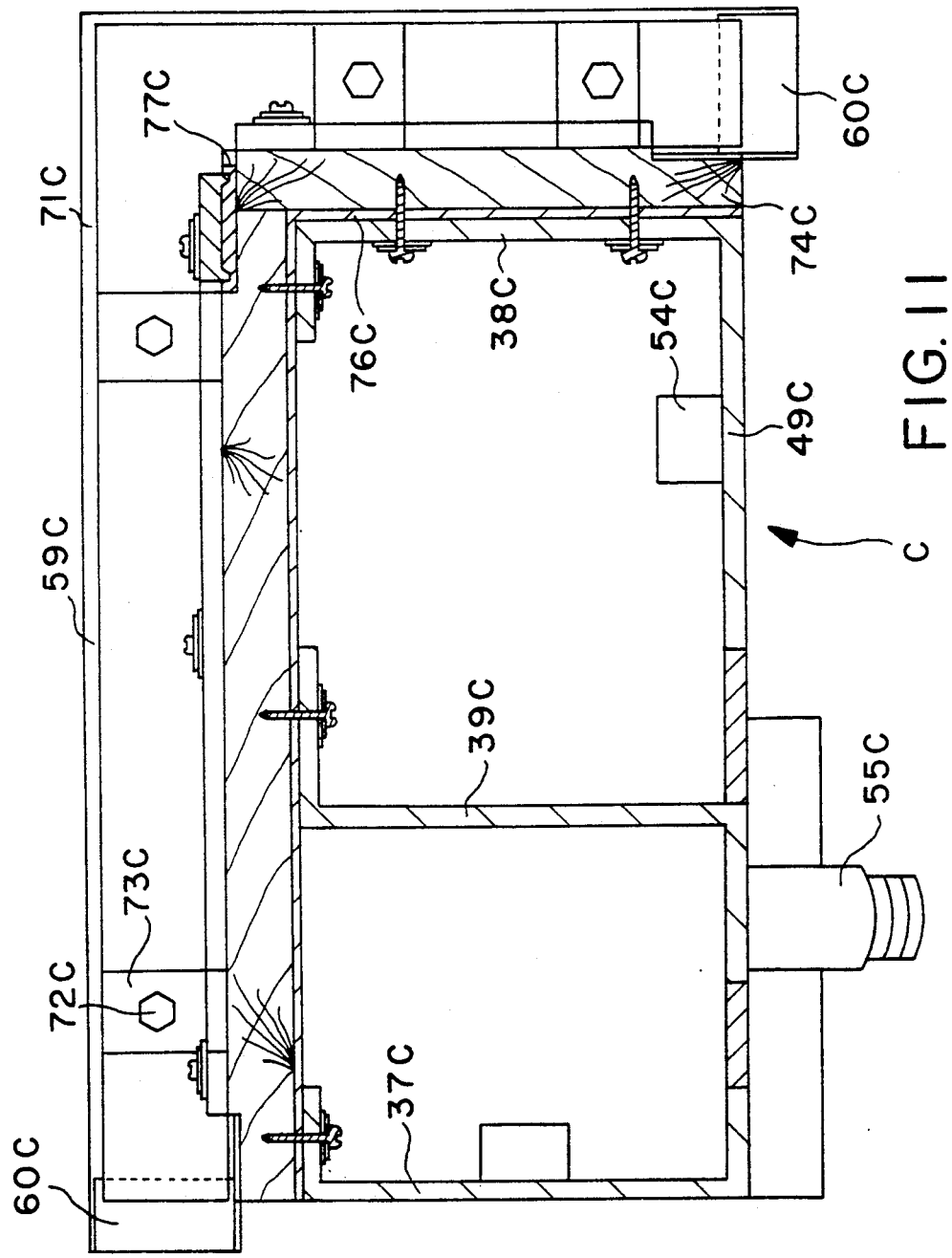
FIG. 11 is a like view of another type of corner forming barrier.

Each unit B, see FIG. 10 has its ed wall 37B provided with a panel 74 one end of which is flush with the shallow seat 31B of the panel 30B against which it is butted and its other end has a shallow seat 75 and is flush with the inner end flange 48B of the end wall 37B. The water proofing layer 76 backs both the panel 30B and the panel 74.

The end flange 48B is longer than the corresponding end flange 48 of the units A in order that it may serve as a wall against which an end wall 37 of unit A may be butted against it and bolted thereto, the end flange 48B being provided with bosses 54B for that purpose.

The end wall 38B differs from the end wall 38 in that it is flush with the proximate end of the panel 30B. The external sealing of the vertical junction between the panels 74 and 30B is effected by a vertical seal 77. The lengthwise seal 59B which differs from the lengthwise seal 59 of the units A in that it and the pressure bar 71B are both L-shaped.

An additional difference is that the intermediate wall 39B is positioned to enable the fitting 55B to be so located that when a bracing rod 57 is connected thereto, it will clear the panel attached to the inner flange end 48B.

Each unit C is generally similar to but somewhat the opposite of the units B in that it is the end wall 38C which is provided with a panel, the panel 74C and its interior surface and that of the panel 30C are protected by the water proofing layer 76C. The inner flange 49C is of increased length and provided with bosses 54C to enable the end of a unit butted against it to be bolted thereto. The intermediate wall 39C is so positioned that a bracing rod 57 is connected to its fitting 55C. The vertical and horizontal sealing of the unit C is effected in the same way employed with the units B.

Figure 12:
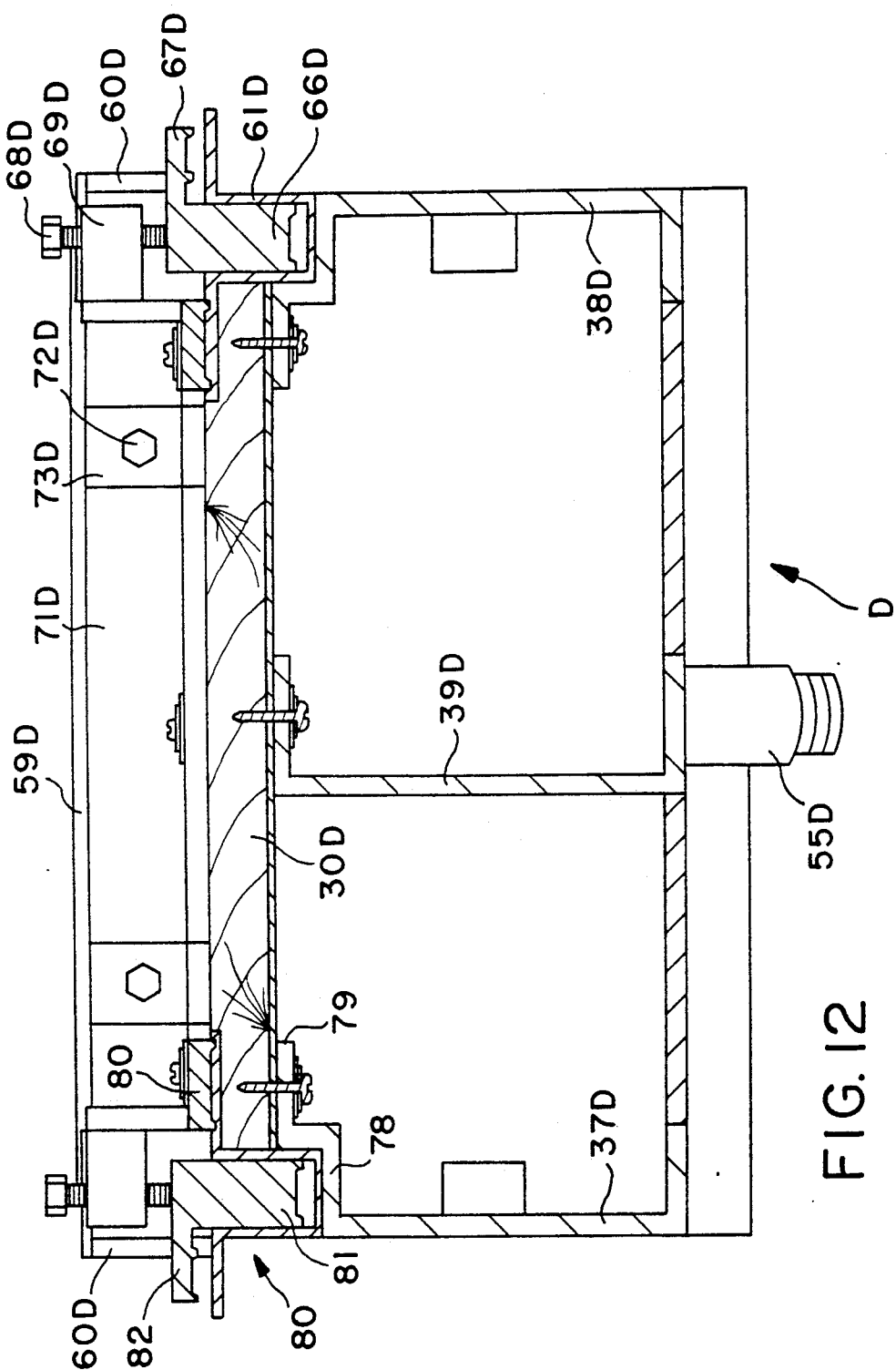
FIG. 12 is another like view of unit used with either of the units of FIG. 10 or of FIG. 11 in completing a corner.

A unit A may be connected directly to the inner end flange 48B of a unit B or to the inner end flange 38C of a unit C but not otherwise and, accordingly, units D are provided to serve as adapters. As will be apparent from FIG. 12, each unit D has its end wall 37D provided with a shoulder 78 offsetting the outer end flange 79 thereof so that both end walls and shoulders are exposed t each end of the panel 30D. A vertical seal, 80 shown as identical to the seal 61D, is held against the shoulder 78 by a bar 81, similar to the bar 66D and held in place in the same manner, which has a wing 82 disposed oppositely to the wing 67D thus enabling it to be connected to a corner establishing unit where a unit A cannot be used.

From the foregoing, both the details of a barrier in accordance with the invention and the manner in which it is installed are readily apparent.

I claim:

1. A barrier to protect an area from flood waters, said barrier including a permanent channel disposed in the path of flood waters and provided with a seat extending along the channel wall which is first in the flood path and a plurality of temporary units removeably seated, in the channel, each unit provided with a front panel disposed to face flood waters and a reenforcement to which the panel is attached and which establishes the length and width of the unit, the reenforcement including vertical end walls, an intermediate vertical wall and a base, the units positioned with selected walls of adjacent units in mutual contact and releaseably interconnected releaseable means vertically sealing the junction between each two adjacent units and constituting a detachable component of one of them, and sealing means extending lengthwise of the panel of each unit adjacent the base thereof and in releaseable sealing contact with the channel seat.

2. The barrier of claim 1 in which there is a series of permanent seats spaced lengthwise of and from the other channel wall and the barrier includes braces, one for each unit and detachably connected to the intermediate wall thereof and to the proximate one of the seats.

3. The barrier of claim 1 in which the channel has a flat bottom and the base of each unit is provided with rotatable supporting members in contact therewith.

4. The barrier of claim 1 in which each side wall of the channel has a lengthwise retainer and each unit has a lengthwise shoulder on each side secured to the reenforcement adjacent the base thereof and spaced to closely underlie the retainer.

5. The barrier of claim 4 in which there is a gap in the retainer on the channel wall adjacent the series of seats the length of which is such as to accommodate the shoulder of a unit which is to underlie the retainer on either side of the gap.

6. The barrier of claim 1 ion which the channel includes two sections disposed at right angles to each other with the barrier at the resulting corner including a unit provided with an additional panel secured to one end wall and disposed to face the flood waters, a unit provided with vertical sealing means at one end as a component thereof which seals the junction between the first and second named units and a third unit an end wall of which is connected to the intermediate reenforcement of the first named unit with the panel of the first and last named units in the same plane, the last named unit provided with vertical sealing means as end components thereof with one such sealing means sealing the junction of the first and last named units.

7. The barrier of claim 1 in which the lengthwise sealing means includes a seal having a U-shaped portion and a wing, the wing connected to the panel, a pressure bar in the U-shaped portion and adjustable means connected to the panel and operable to exert pressure on the bar to seal the U-shaped portion against the channel seat.

* * * * *